(No Model.)

M. PAYNE.
SULKY.

No. 251,934. Patented Jan. 3, 1882.

WITNESSES
Fred. G. Dieterich.
P. C. Dieterich.

Martin Payne.
INVENTOR,
by Louis Bagger & Co.
his Attorneys,

N. PETERS, Photo-Lithographer, Washington, D. C.

United States Patent Office.

MARTIN PAYNE, OF TROY, NEW YORK.

SULKY.

SPECIFICATION forming part of Letters Patent No. 251,934, dated January 3, 1882.

Application filed September 15, 1881. (No model.)

*To all whom it may concern:*

Be it known that I, MARTIN PAYNE, of Troy, in the county of Rensselaer and State of New York, have invented certain new and useful Improvements in Sulky-Vehicles; and I do hereby declare that the following is a full, clear, and exact description of the invention, which will enable others skilled in the art to which it appertains to make and use the same, reference being had to the accompanying drawings, which form a part of this specification, in which—

Figure 1:
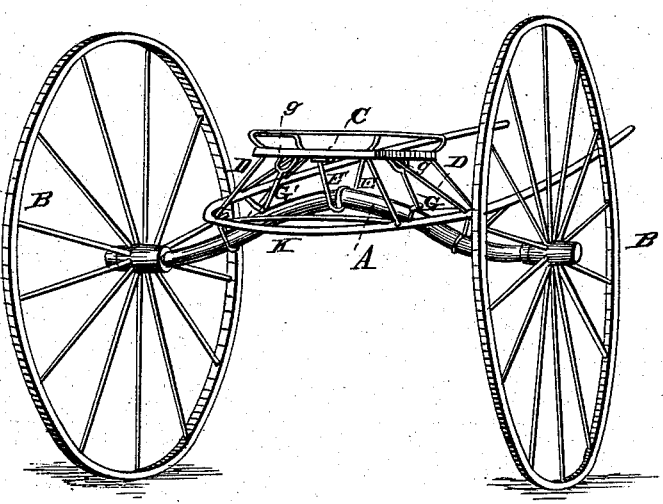
Figure 2:
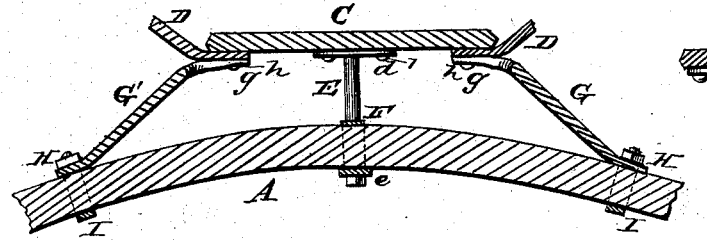
Figure 3:
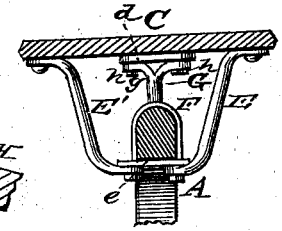
Figure 4:
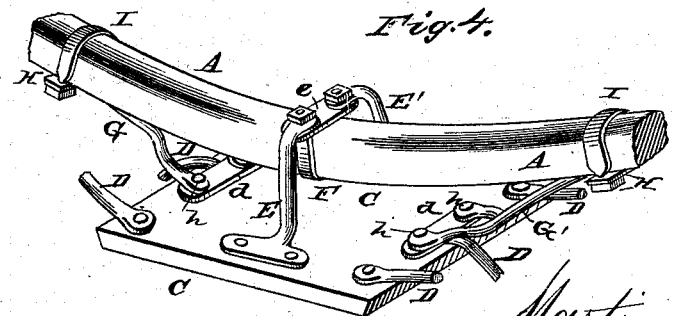

Figure 1 is a perspective rear view of a sulky embodying my improvement. Fig. 2 is a vertical section laid longitudinally through the axle. Fig. 3 is a vertical section through the seat and its front and back braces at right angles to Fig. 2; and Fig. 4 is a perspective view of the under side of the seat.

Similar letters of reference indicate corresponding parts in all the figures.

My invention has relation to sulky-vehicles; and it consists in an improved method of bracing the seat upon the axle, as hereinafter more fully set forth, and particularly pointed out in the claim.

In the annexed drawings, A represents the axle, B B the wheels, and C the seat, of a sulky.

As usual in this class of vehicles, the seat is secured by a set of arms or braces, usually three on each side, (shown at D,) which connect it with the pole-bow K, the middle or center brace on each side being in the same vertical plane as the axle, while the corner-braces reach well forward and back, as clearly shown in Fig. 1 of the drawings.

E and E' represent respectively the front and back braces of the seat, which are rigidly connected at their lower end by a short cross-bar, $e$, which is fastened to the under side of the axle by a clip, F.

G and G' are the side braces, which are bifurcated at their upper ends, where they are attached to the under side of the seat, as shown at $g$, to make room for the middle pole-braces or seat-supports, D. By reference to Fig. 4 of the drawings it will be seen that the said seat-supports D have T-shaped heads $d$, by which they are bolted to the under side of the seats, and that the bifurcated ends $g$ of the braces G G' are secured upon the under side of the seat by the same bolts, $h\ h$, which form the fastenings for the seat-supports D. The lower ends of the side braces, G and G', have cross-heads H, by means of which they are secured upon the top of the arched axle A by clips $i$, so that the axle is not weakened by bolt holes.

By this method of bracing the seat the seat and axle mutually strengthen and support one another; there is no danger of the breaking or bending of the seat-supports D, and the auxiliary set of braces E E' and G G' may be made sufficiently light not to increase the weight of the vehicle perceptibly.

Having thus described my improvement, I claim and desire to secure by Letters Patent of the United States—

In a sulky-vehicle, the front and back braces, E E', clipped to the under side of the middle part of the axle, and the bifurcated side braces, G G', clipped to the top of the axle, in combination with the lateral seat-supports D, for connecting the seat C and axle A, substantially as and for the purpose herein shown and specified.

In testimony that I claim the foregoing as my own I have hereunto affixed my signature in presence of two witnesses.

MARTIN PAYNE.

Witnesses:
AUGS. H. EATON,
CHARLES RUSHMORE.